United States Patent
Alix et al.

[11] Patent Number: 5,982,883
[45] Date of Patent: Nov. 9, 1999

[54] TELEPHONE COMPRISING A SLIDING MICROPHONE

[75] Inventors: Philippe Alix; Simon Bradford; Benoit Girardin, all of Le Mans, France

[73] Assignee: U.S. Philips Corporation, New York, N.Y.

[21] Appl. No.: 08/966,222

[22] Filed: Nov. 7, 1997

[30] Foreign Application Priority Data

Nov. 12, 1996 [FR] France ................................. 96 13756

[51] Int. Cl.⁶ .................................................. H04M 1/00
[52] U.S. Cl. ............................................................ 379/433
[58] Field of Search ..................... 379/426, 428, 379/431, 433, 446, 447, 449, 450; 455/90, 312, 346, 347, 348, 351, 575; 439/78, 188, 374

[56] References Cited

U.S. PATENT DOCUMENTS

| 4,251,696 | 2/1981 | MacKenzie et al. | 379/433 |
| 5,109,539 | 4/1992 | Inubushi et al. | 455/575 |
| 5,151,946 | 9/1992 | Martensson | 379/433 |
| 5,517,683 | 5/1996 | Collett et al. | 455/575 |
| 5,673,314 | 9/1997 | Olkoski et al. | 379/433 |
| 5,724,667 | 3/1998 | Furuno | 455/575 |

FOREIGN PATENT DOCUMENTS

0414365A2 2/1991 European Pat. Off. ......... H04M 1/02

*Primary Examiner*—Jack Chiang
*Attorney, Agent, or Firm*—Dicran Halajian

[57] ABSTRACT

A communication device is disclosed having a housing which houses a transceiver. Two transducers transform signals between sound waves and electrical signals. A sliding member includes one of the transducers. The sliding member is retracted into the housing in a retracted position and is extended away from the housing in an extended position. A positioning device positions the sliding member in the retracted or the extended position. The positioning device including a bar and a collar which rotates around the bar in response to a force directed inward toward the housing to maintain the sliding member in the retracted or extended position.

20 Claims, 4 Drawing Sheets

TELEPHONE COMPRISING A SLIDING MICROPHONE

BACKGROUND OF THE INVENTION

The invention relates to a telephone comprising:

a framework in which a housing is provided, a first transducer for transforming sound waves into variations of electrical magnitudes, a second transducer for transforming variations of electrical magnitudes into sound waves, a slide bar on which one of said transducers is arranged which allow of taking up at least two positions: one retracted position, slid into said housing and one extended position coming out of said housing.

Telephones become ever smaller, so that the first transducer (the microphone) moves away from the speaker's mouth when he holds the second transducer (loudspeaker) to his ear when it is incorporated in the body of the apparatus. Thus, measures are to be taken to extend this microphone-loudspeaker distance.

A radio telephone of this type is known from European patent specification No. EP 0 414 365. In this known radio telephone, the sliding part is put in retracted position against the tension exerted by a spring to the on-hook condition, and in extended position by breaking the connection via the off-hook condition. To release the spring, a release button is depressed, so that for extending the sliding part one has to find this release button and depress it. For retracting this part, the sliding part is pushed up, as has already been observed. For handling this known radio telephone, one is obliged to carry out several movements of the hands.

This is considered a drawback.

The present invention proposes a telephone of the type defined in the opening paragraph which does not have this drawback of the known telephone.

OBJECTS AND SUMMARY OF THE INVENTION

Therefore, such a telephone is characterized in that it further comprises:

a ratchet bar system for maintaining the sliding part in either position by making a single pushing movement.

Thus, by resting the end of the sliding part on, for example, a table, the user can retract or extend the sliding part by carrying out the same movement single-handedly.

A highly significant characteristic feature of the invention consists of providing that a telephone line contactor is coupled to said sliding part. This provides the advantage that taking a call and ending a call is made easier. There are no more operations to be carried out other than retracting or extending the sliding part.

These and other aspects of the invention will be apparent from and elucidated with reference to the embodiments described hereinafter.

DETAILED DESCRIPTION OF THE PREFERRED EMBODIMENT

Figure 1A:
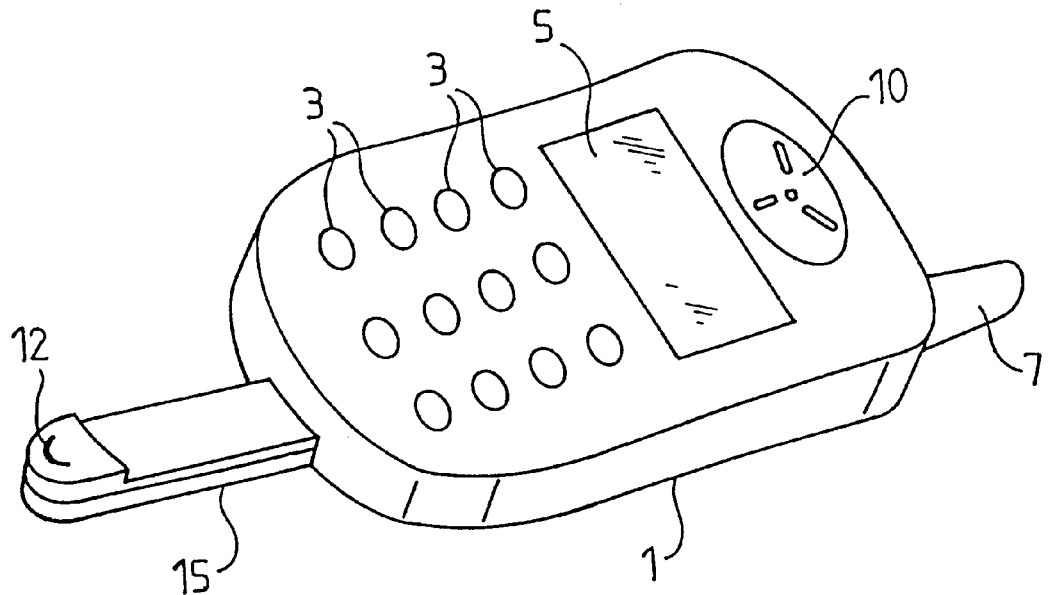
FIGS. 1A–1B show the extended and retracted positions of a telephone according to the invention.
Figure 1B:
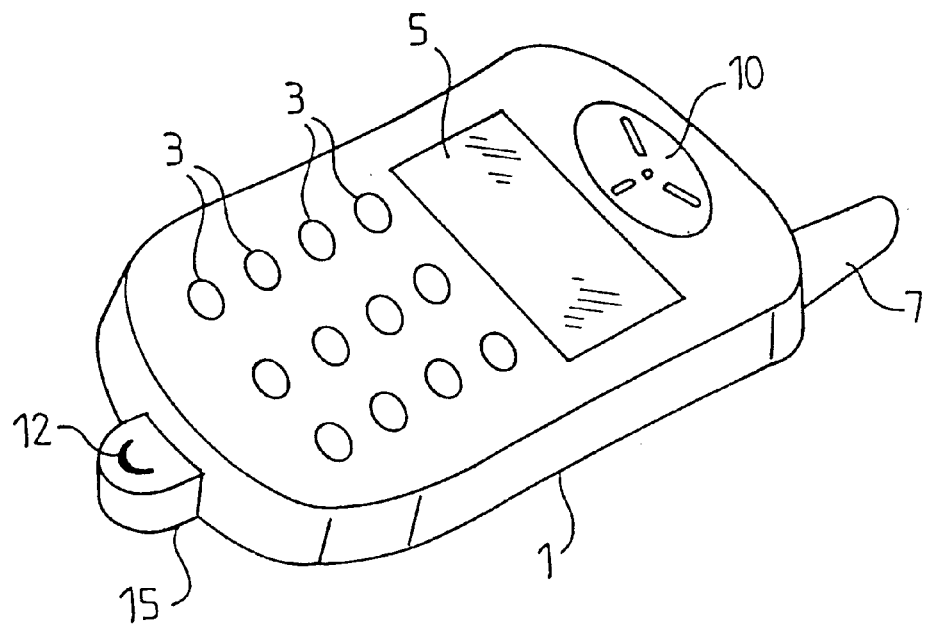

In FIGS. 1A–1B, the telephone is formed on the basis of a framework 1 on which are arranged, notably, a keyboard 3, a screen 5 and an antenna 7. The framework also accommodates the earphone 10. The microphone 12 is arranged on a sliding part 15 which is shown in FIG. 1A in extended position and in FIG. 1B in a retracted position. Without leaving the scope of the invention, the earphone 10 could be arranged on a sliding part and the microphone 12 on the framework 1. It is also possible, still without leaving the scope of the invention, to place the microphone 12 and the earphone 10 each on a sliding part.

Figure 2:
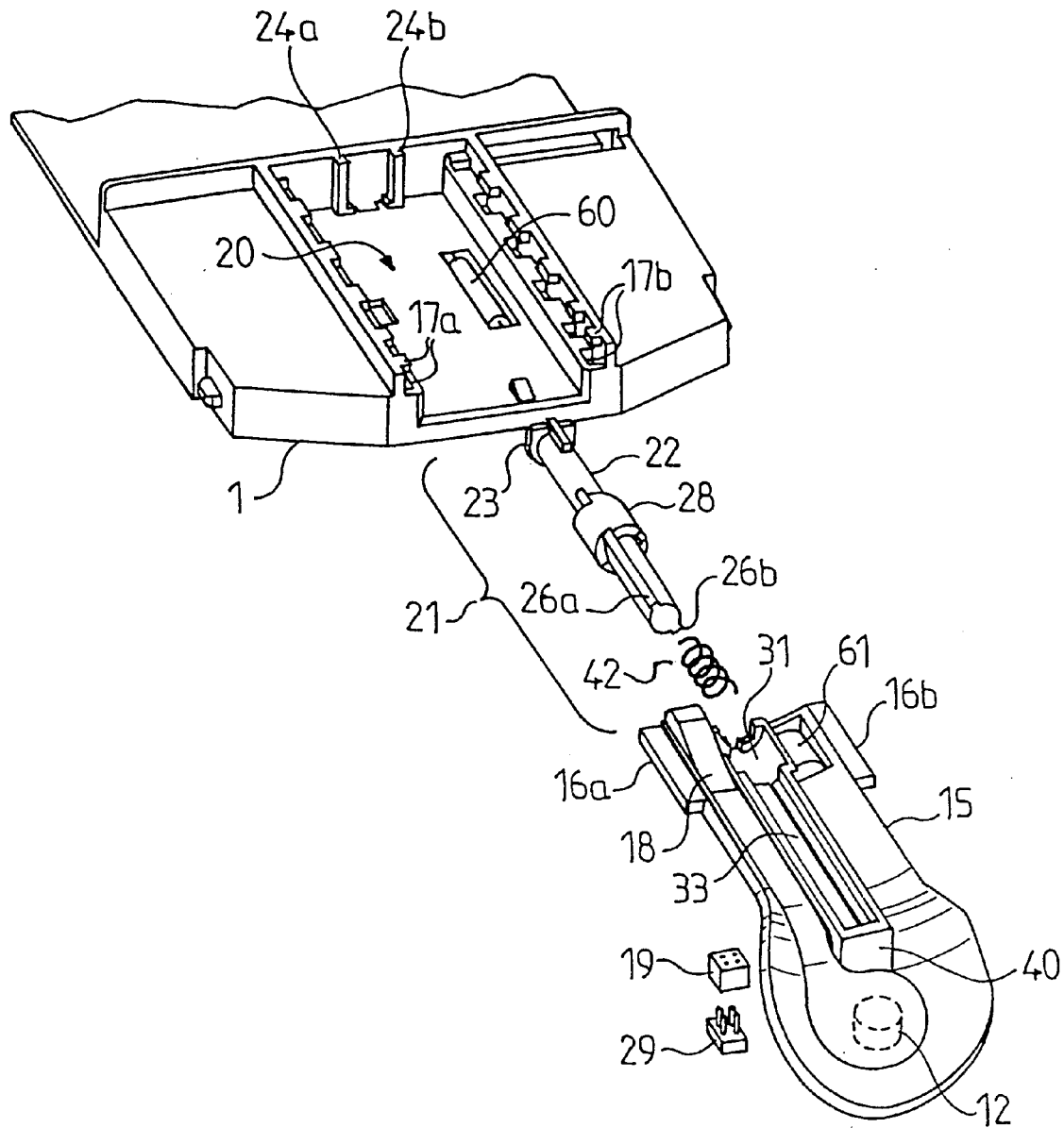
FIG. 2 shows in an exploded and partial view the sliding part and its housing provided in the telephone shown in FIG. 1, FIGS. 3A–3B show in more detail a part of the ratchet system.

In FIG. 2, which is an exploded view, reference 20 shows the housing in which the sliding part 15 is accommodated when it is in retracted position. This sliding is made easy by the rib form of the edges 16a and 16b which are displaced in the notched guides 17a and 17b. The microphone is connected to the electronic circuitry (not shown in the Figure) by a flat cable or a flexible printed circuit 18 (flexfoil) to which is connected a socket 19. This socket slides over a plug 29 which forms part of the electronic circuitry of the apparatus.

According to the invention, there is provided a ratchet system 21 which allows of going from the extended position to the retracted position and vice versa.

This system, known per se, is formed by a slide pin 22 having a clip 23 which fits into fixing slots 24a and 24b. In this manner, this pin is firmly attached to the framework 1. This pin 22 has two guide ribs 26a and 26b along part of its length. Another part is smooth over a distance which is sufficient for permitting of the rotation of a collar 28. This collar is accommodated in a cavity 31 provided in the sliding part, so that the longitudinal movements of this collar 28 are integral with those of the sliding part 15. This cavity ends in a pipe 33 which conforms in shape to the pin 22 to ensure the free longitudinal displacement of part 15 and which has a stop 40. A spring 42 rests, on the one hand, on an end of the pin 22 and, on the other hand, on the stop 40 of the pipe 33. The spring thus exerts a pressure which tends to put the sliding part 15 in extended position.

Figure 3A:
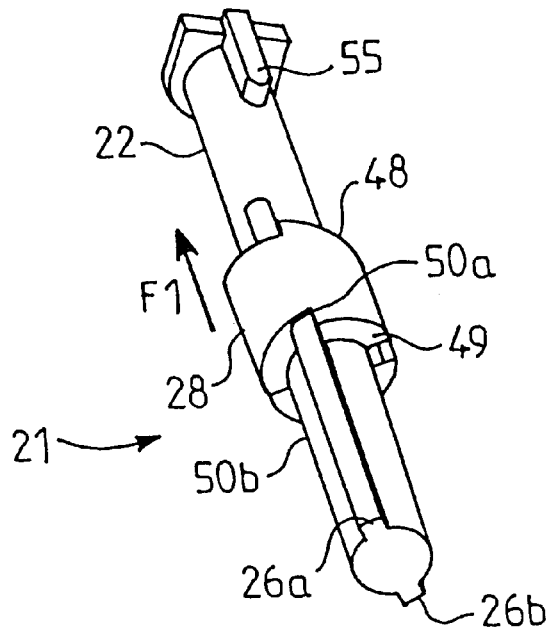
Figure 3B:
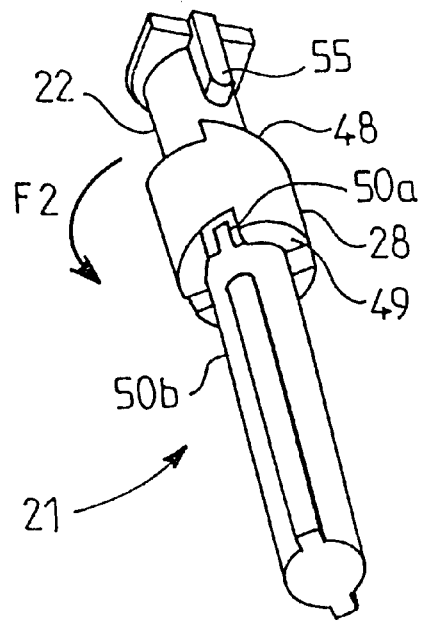

FIGS. 1A–1B show in more detail the ratchet system 21. FIG. 3A, the collar 28 is shown in the same position as in the previous Figure. This collar has a sawtooth profile on its two ends 48 and 49. In this position, the ribs 26a and 26b penetrate into the respective openings 50a and 50b provided in this collar in parallel with the pin (only opening 50a is visible in FIGS. 3A–3B), so that a longitudinal displacement of the collar 28 along the pin 22 is possible, as indicated by the arrow F1. Because the collar 28 is placed in the cavity 31, this displacement occurs when one pushes the sliding part into the direction of the framework 1. If this longitudinal movement of the collar 28 according to the arrow F1 is prolonged, the collar 28 is set free from its ribs 26a and 26b as is represented in FIG. 3B and may pivot around the pin 22 as indicated by arrow F2, so that, when a tooth 55 located at one end of the pin 22 meets the cam profile of the end 48, the collar turns through a certain angle. Thus, when the longitudinal movement is reversed, the ribs 26a and 26b stop against the face of this collar, the sliding part 15 is retracted. If one pushes once more, the collar 28 turns through an angle which, with the aid of the cam profile of the end 49, makes it possible for the openings 50*a* to coincide with the ribs 26*a* and 26*b*. Then the sliding part 15 can be extended.

According to a second aspect of the invention, the displacement of the sliding part 15 involves taking the line. This is obtained by opening and/or closing a line contactor 60, shown in FIG. 2. This contactor is a glass capsule of a reed relay which relay closes and/or opens when a magnet 61 inserted into the sliding part comes near.

Figure 4:
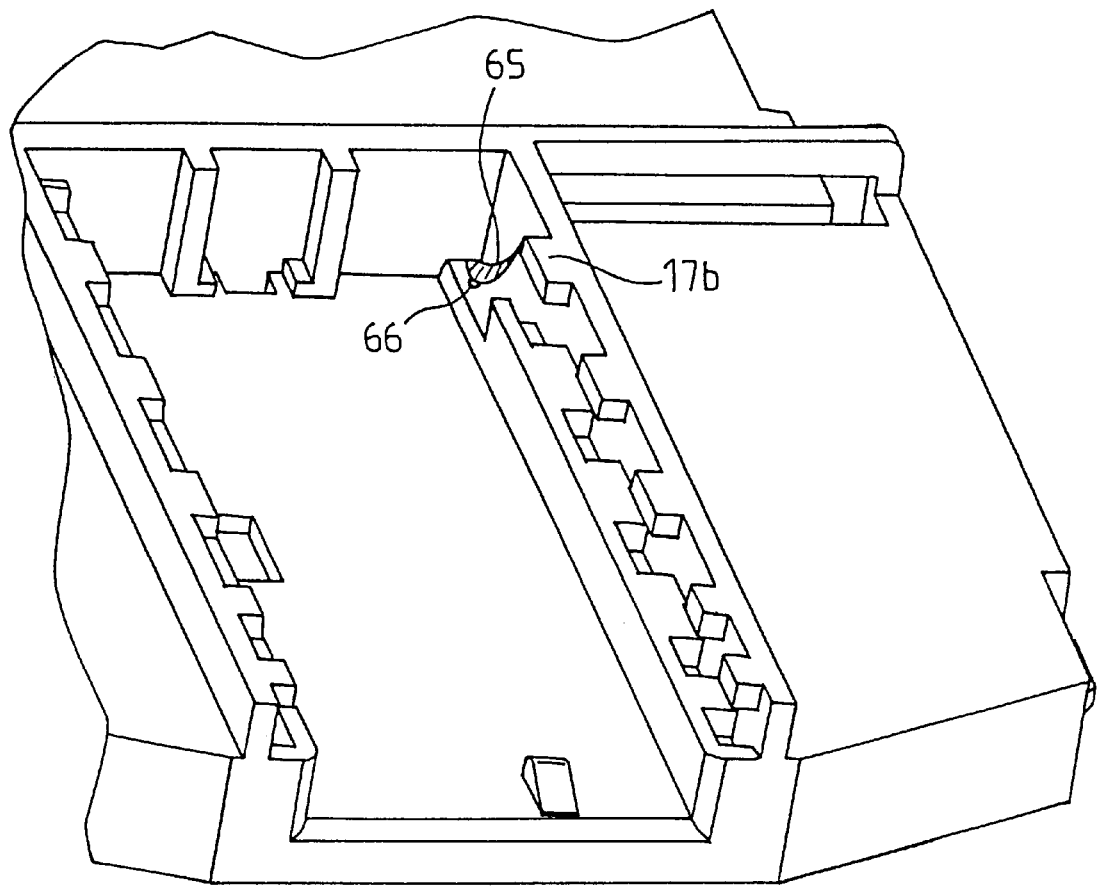
FIG. 4 shows the implantation of a line contactor.

Another way of embodying this line contactor shown in FIG. 4 is to use a spring contact sheet 65 which closes the contact when the sliding part is in extended position and which opens same when the sliding part is in retracted position. The sheet 65 is fixed to the upper part of the guide 17*b* and the contact is realized at the level of the lower part.

Figure 5A:
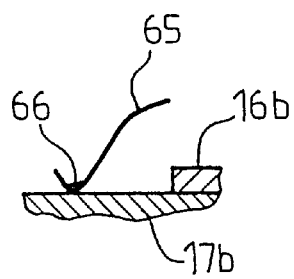
FIGS. 5A–5B show a cross-sectional view of the line contactor shown in FIG. 4, and FIGS. 6A–6B show a cross-sectional view of another line contactor.
Figure 5B:
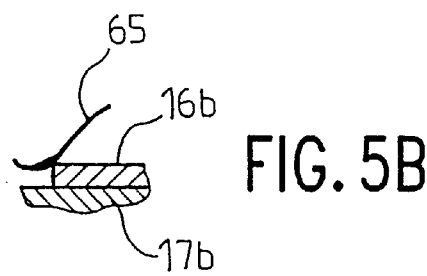

FIG. 5A shows the operation when the contact is formed and FIG. 5B shows the operation, when the guide rib pushes the sheet 65 away from making contact.

Figure 6A:
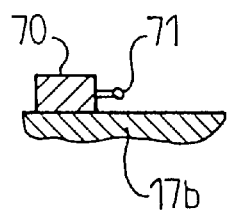
Figure 6B:
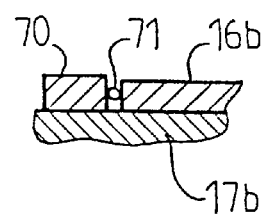

FIGS. 6A–6B show still another manner of realizing this line contactor. It consists of placing an interrupter 70 at the end of the sliding part, so that the end of guide rib 16*b* forming a stop rests on the contact control pin 71 of the device 70.

Said line contactor is formed in another manner by a Hall-effect system which operates in similar manner to that of the reed relay.

Other means for realizing various parts of the apparatus continue to be within the scope of the invention, for example, the connection of the microphone to the electronic circuitry may be effected by conductive parts (obtained via metallic depositions) placed on the guide ribs 16*a* and 16*b* and co-operating with one or various, also metallic, guide notches 17*a* and 17*b*.

We claim:

1. A communication device comprising:
 a housing which houses a transceiver;
 a first transducer which transforms transmit sound waves into transmit electrical signals;
 a second transducer which transforms received electrical signals into received sound waves;
 a sliding member which includes one of said first and second transducers; said sliding member being retracted into said housing in a retracted position and being extended away from said housing in an extended position; and
 a positioning device which positions said sliding member in said retracted position and said extended position;
 said positioning device including a bar and a collar which rotates around said bar in response to a force directed inward toward said housing to maintain said sliding member in one of said retracted position and said extended position.

2. The communication device of claim 1, wherein said collar includes an opening which accept a guide of said bar when rotated to a first position to allow positioning of said sliding bar in said retracted position; said guide abutting against said collar when said collar is rotated to a second position to allow positioning of said sliding bar in said extended position.

3. The communication device of claim 2, further comprising a spring located between an end of said sliding member and said positioning device to provide a biasing force which maintains said sliding member in said extended position.

4. The communication device of claim 1, wherein said housing includes an activation switch which is activated to turn on said communication device when said sliding member is in said extended position and is deactivated to turn off said communication device when said sliding member is in said retracted position.

5. The communication device of claim 1, wherein said housing includes an activation switch which is activated to turn on said communication device when said sliding member is in said extended position.

6. The communication device of claim 5, wherein said activation switch includes a spring leaf.

7. The communication device of claim 5, wherein said activation switch includes an interrupter.

8. The communication device of claim 5, wherein said activation switch includes an interrupter having a control pin, said sliding member having a stop which contacts said control pin is said retracted position.

9. The communication device of claim 5, wherein said activation switch is formed by a Hall-effect system.

10. The communication device of claim 5, wherein said activation switch is formed by a reed relay system.

11. The communication device of claim 1, wherein said one transducer located on said sliding member is connected to said frame by a flexible printed circuit.

12. The communication device of claim 1, wherein said one transducer located on said sliding member is connected to said frame by tracks provided on said sliding member.

13. A communication device comprising:
 a housing which houses a transceiver;
 a first transducer which transforms transmit sound waves into transmit electrical signals;
 a second transducer which transforms received electrical signals into received sound waves;
 a sliding member which includes one of said first and second transducers; said sliding member being retracted into said housing in a retracted position and being extended away from said housing in an extended position; and
 a positioning device which positions said sliding member in said retracted position and said extended position;
 wherein said positioning device includes a bar and a collar located around said bar; said collar rotating around said bar to a first position in response to a first force directed inward toward said housing to allow positioning of said sliding member in said extended position, a second force directed inward toward said housing rotating said collar around said bar to a second position to allow positioning of said sliding member in said retracted position.

14. The communication device of claim 13, wherein said collar includes an opening which accepts a guide of said bar when rotated to said second position, said guide abutting against said collar when said collar is rotated to said first position.

15. The communication device of claim 13, further comprising a spring located between an end of said sliding member and said positioning device to provide a biasing force which maintains said sliding member in said extended position.

16. The communication device of claim 13, wherein said housing includes an activation switch which is activated to turn on said communication device when said sliding member is in said extended position and is deactivated to turn off said communication device when said sliding member is in said retracted position.

17. The communication device of claim 13, wherein said housing includes an activation switch which is activated to turn on said communication device when said sliding member is in said extended position.

18. The communication device of claim 17, wherein said activation switch includes one of a spring leaf, an interrupter, Hall-effect system, and a reed relay system.

19. The communication device of claim 17, wherein said activation switch includes an interrupter having a control pin, said sliding member having a stop which contacts said control pin is said retracted position.

20. The communication device of claim 13, wherein said one transducer located on said sliding member is connected to said frame by one of a flexible printed circuit and tracks provided on said sliding member.

\* \* \* \* \*